(12) United States Patent
Wong et al.

(10) Patent No.: US 7,773,668 B1
(45) Date of Patent: Aug. 10, 2010

(54) ADAPTIVE EQUALIZATION METHODS AND APPARATUS FOR PROGRAMMABLE LOGIC DEVICES

(75) Inventors: Wilson Wong, San Francisco, CA (US); Sergey Shumarayev, San Leandro, CA (US); Simardeep Maangat, Sunnyvale, CA (US); Rakesh Patel, Cupertino, CA (US)

(73) Assignee: Altera Corporation, San Jose, CA (US)

( * ) Notice: Subject to any disclaimer, the term of this patent is extended or adjusted under 35 U.S.C. 154(b) by 1142 days.

(21) Appl. No.: 10/762,864

(22) Filed: Jan. 21, 2004

(51) Int. Cl.
*H03H 7/30* (2006.01)
*H03H 7/40* (2006.01)

(52) U.S. Cl. .................. 375/229; 375/232

(58) Field of Classification Search .......... 375/229, 375/230, 231, 232, 233, 234, 235, 236; 326/39; 708/300, 305, 316, 322, 323; 333/18; 370/290, 370/292
See application file for complete search history.

(56) References Cited

U.S. PATENT DOCUMENTS

| | | | |
|---|---|---|---|
| 3,633,120 A | 1/1972 | Battjes | 330/30 R |
| 4,723,110 A | 2/1988 | Voorman | 330/252 |
| 4,773,034 A * | 9/1988 | Debus, Jr. | 708/323 |
| 5,420,538 A | 5/1995 | Brown | 330/252 |
| 5,504,783 A * | 4/1996 | Tomisato et al. | 375/267 |
| 5,809,074 A * | 9/1998 | Werner et al. | 375/233 |
| 6,128,011 A * | 10/2000 | Peng | 715/744 |
| 6,178,201 B1 * | 1/2001 | Hillery | 375/232 |
| 6,236,231 B1 | 5/2001 | Nguyen et al. | 326/39 |
| 6,275,836 B1 * | 8/2001 | Lu | 708/313 |
| 6,381,085 B1 * | 4/2002 | Du et al. | 360/65 |
| 6,396,872 B1 * | 5/2002 | Sugiyama | 375/232 |
| 6,650,140 B2 | 11/2003 | Lee et al. | 326/39 |
| 6,724,328 B1 | 4/2004 | Lui et al. | 341/101 |
| 6,940,898 B2 * | 9/2005 | Shanbhag et al. | 375/234 |
| 7,110,927 B1 * | 9/2006 | San et al. | 703/13 |
| 2002/0027952 A1 * | 3/2002 | Kokuryo et al. | 375/230 |
| 2003/0052709 A1 | 3/2003 | Venkata et al. | 326/37 |
| 2004/0071205 A1 * | 4/2004 | Gorecki | 375/232 |
| 2005/0047779 A1 * | 3/2005 | Jaynes et al. | 398/29 |
| 2006/0114979 A1 * | 6/2006 | Pedersen et al. | 375/229 |
| 2006/0133551 A1 * | 6/2006 | Davidoff et al. | 375/350 |

OTHER PUBLICATIONS

WinSLAC Software User's Guide (AMD, 1999).*

(Continued)

*Primary Examiner*—Chieh M Fan
*Assistant Examiner*—Aristocratis Fotakis
(74) *Attorney, Agent, or Firm*—Ropes & Gray LLP; Robert R. Jackson; Gall C. Gotfried (57) ABSTRACT

A programmable logic device is provided with adaptive equalization circuitry that is programmable in one or more respects. Examples of the programmable aspects of the equalization circuitry are (1) the number of taps used, (2) whether integer or fractional spaced taps are used, (3) what starting values are used in the computation of coefficient values, (4) whether satisfactory coefficient values are computed only once or on an on-going basis, (5) whether an error signal is generated using a decision directed algorithm or using a training pattern, (6) what training pattern (if any) is used, and/or (7) the location of the sampling point in the bit period of the signal to be equalized.

34 Claims, 5 Drawing Sheets

MATCH TO FIG. 4

OTHER PUBLICATIONS

Solution Brief 41, FIR Compiler MegaCore Function User, Altera Corporation, Jun. 1999.*
U.S. Appl. No. 10/317,262, filed Dec. 10, 2002, Venkata et al.
U.S. Appl. No. 10/317,264, filed Dec. 10, 2002, Venkata et al.
U.S. Appl. No. 10/349,541, filed Jan. 21, 2003, Venkata et al.
U.S. Appl. No. 10/640,824, filed Aug. 13, 2003, Wang et al.
U.S. Appl. No. 10/640,825, filed Aug. 13, 2003, Wang et al.
U.S. Appl. No. 10/702,195, filed Nov. 4, 2003, Baig et al.
U.S. Appl. No. 10/702,196, filed Nov. 4, 2003, Bereza et al.
U.S. Appl. No. 10/756,949, filed Jan. 13, 2004, Kwasniewski et al.
U.S. Appl. No. 10/757,182, filed Jan. 13, 2004, Baig et al.
B. Gilbert, "The Multi-Tanh Principle: A Tutorial Overview", IEEE Journal of Solid-State Circuits, vol. 33, No. 1, Jan. 1998.

* cited by examiner

ADAPTIVE EQUALIZATION METHODS AND APPARATUS FOR PROGRAMMABLE LOGIC DEVICES

BACKGROUND OF THE INVENTION

This invention relates to programmable logic devices ("PLDs"), and more particularly to equipping PLDs with adaptive equalization capability.

PLDs are typically general-purpose integrated circuit devices that are designed to satisfy any of a wide range of user needs. The user does not have to design his or her own custom integrated circuit, subjecting himself or herself to the cost, delay, possible errors, and inflexibility of such a custom design. Instead, the user can immediately buy a commercially available, already proven PLD and program (configure) that device to perform whatever tasks the user needs to have performed. The PLD manufacturer does not know in advance all the details of all the uses various users may want to make of the PLD. But to give the PLD a reasonably large market to many different users (thereby helping to hold down the cost of the PLD by taking advantages of economies of scale), the manufacturer generally tries to equip a PLD with as many capabilities as is reasonably possible within a broad target range of features for that particular PLD. Each user can then make use of the capabilities or features that the user needs and ignore the other capabilities or features.

PLDs are increasingly of interest for use in communication applications, especially those involving high speed data transmission. There are many different communication protocols and specifications that may be used (e.g., for communicating between devices in a system). If equipped with appropriate communication-supporting features, PLDs offer the possibility of being programmable to function in accordance with many different communication protocols and specifications.

Certain high speed communication protocols may require the receiver circuitry to provide equalization of the received signal (e.g., to compensate for such things as attenuation and/or phase shift of the signal in the course of transmission from the transmitter to the receiver). Any of several approaches may be taken to providing required equalization, and within each approach, different parameter values may need to be used, depending on the nature and extent of equalization that is called for. Moreover, because it is rarely the case that the exact amount of equalization that will be needed in a particular system or in a particular instance of a system will be known a priori, it is frequently desirable for the equalization capability that is provided to be "adaptive" (i.e., to be able to at least partly determine on an automatic or at least partly automatic basis the kind and/or amount of equalization needed in whatever instance is being served). It would be desirable to provide a PLD with circuitry that can meet a wide range of equalization needs such as are referred to above.

SUMMARY OF THE INVENTION

In accordance with the present invention, programmable logic device circuitry for adaptively equalizing a received data signal includes equalization circuitry that is programmable in at least some respect affecting one or more of the following aspects of the equalization circuitry: (1) the number of taps used, (2) whether integer or fractional spaced taps are used, (3) the starting values used for coefficient determination, (4) whether satisfactory coefficients are selected only once or on an on-going basis, (5) whether an error signal used is decision directed or based on a training pattern, (6) what training pattern (if any) is used, and/or (7) the location of the sampling point in the bit period of the signal to be equalized.

Methods in accordance with the invention include selecting various options with respect to one or more of the aspects mentioned in the preceding paragraph.

Further features of the invention, its nature and various advantages, will be more apparent from the accompanying drawings and the following detailed description.

BRIEF DESCRIPTION OF THE DRAWINGS

FIG. 2 shows how FIGS. 3-5 are intended to be viewed together.

DETAILED DESCRIPTION

Figure 1:
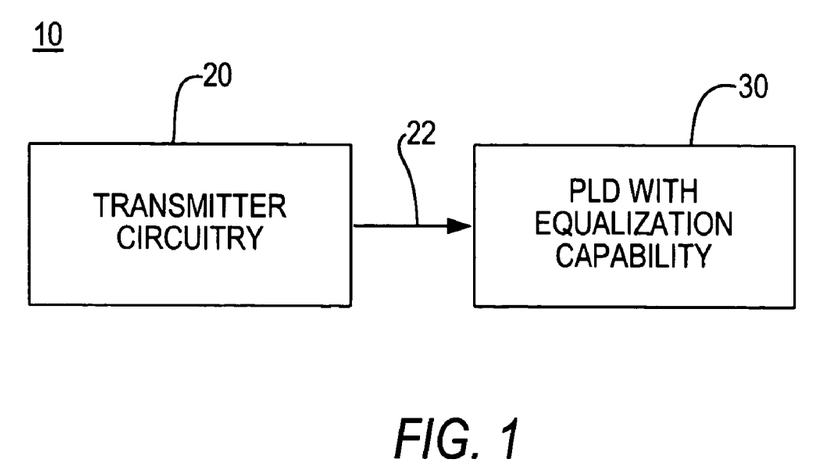
FIG. 1 is a block diagram of an illustrative system that can be constructed in accordance with the invention.
Figure 2:
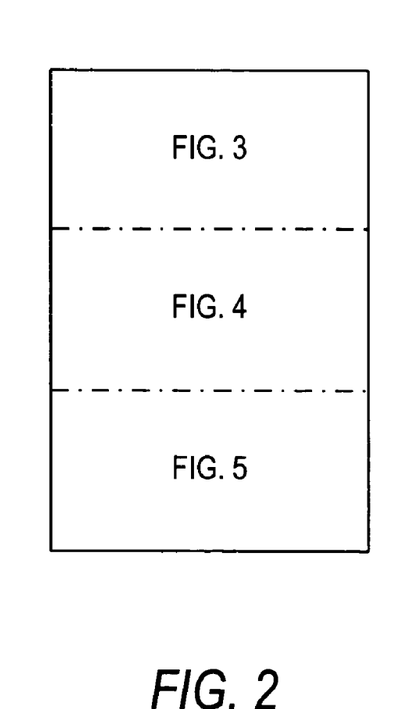

An illustrative system 10 in accordance with the invention is shown in FIG. 1. System 10 includes transmitter circuitry 20 that transmits a signal (e.g., a high-speed digital data signal) to receiver circuitry 30 via lead 22. In the particular example shown in FIG. 1 receiver circuitry 30 is a programmable logic device ("PLD") with equalization capability in accordance with the invention. The equalization capability of PLD 30 is used to produce an equalized version of the signal received via lead 22. It will be understood that the equalization capability of PLD 30 may be only part of the capability and circuitry of the PLD, and that in addition to its equalization circuitry, PLD 30 may also have other circuitry and capability such as circuitry for making use of the equalized signal that is produced from the incoming signal on lead 22. Similarly, receiver circuitry 30 may include other components in addition to the depicted PLD. For example, the PLD portion of the receiver may be used (among other things) to produce an equalized version of incoming signal 22 for use by other components that are part of a larger receiver subsystem 30.

Figure 3:
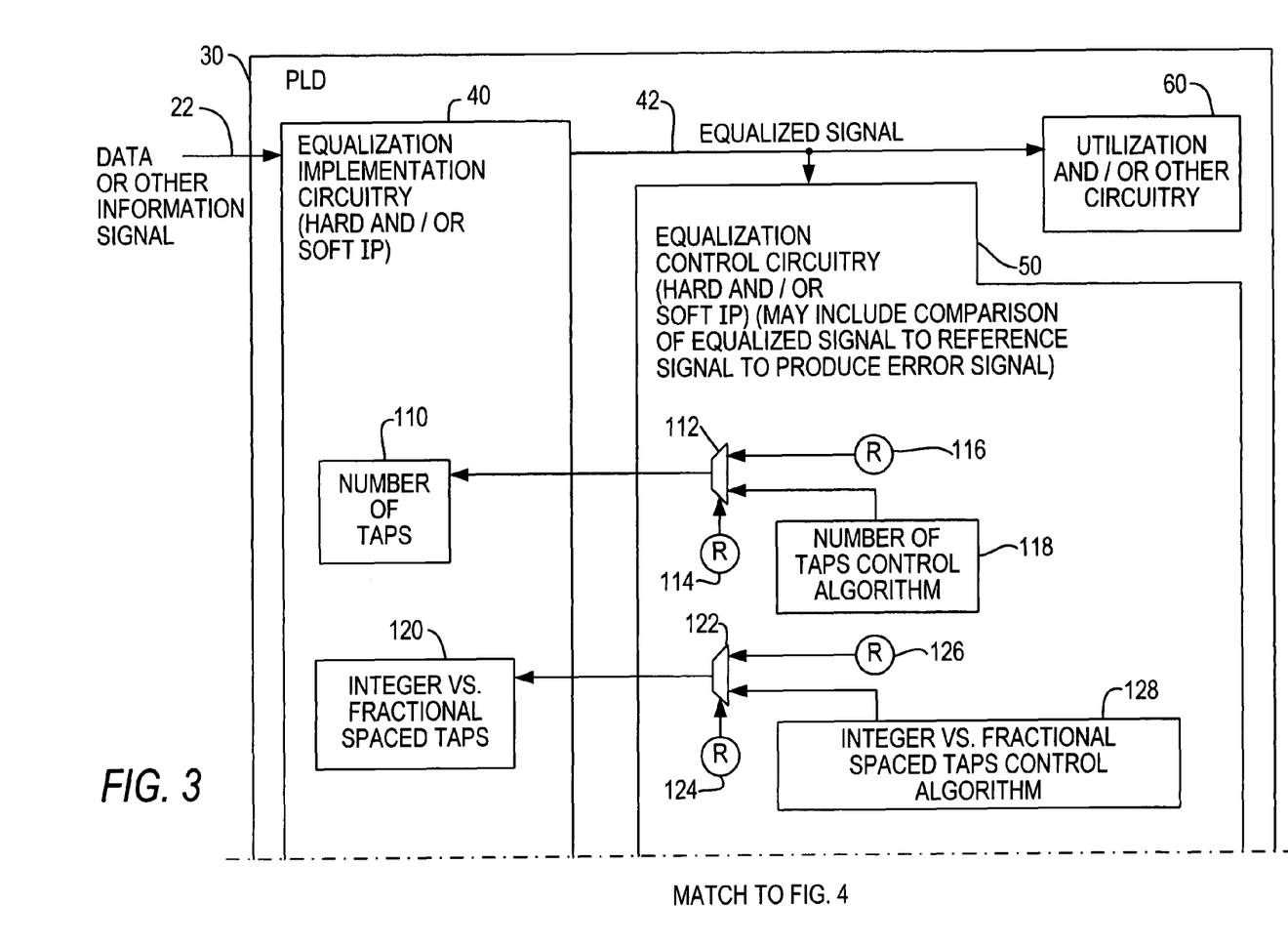
FIGS. 3-5 (viewed together as shown in FIG. 2) are collectively a simplified schematic block diagram of an illustrative embodiment of circuitry constructed in accordance with the invention.
Figure 4:
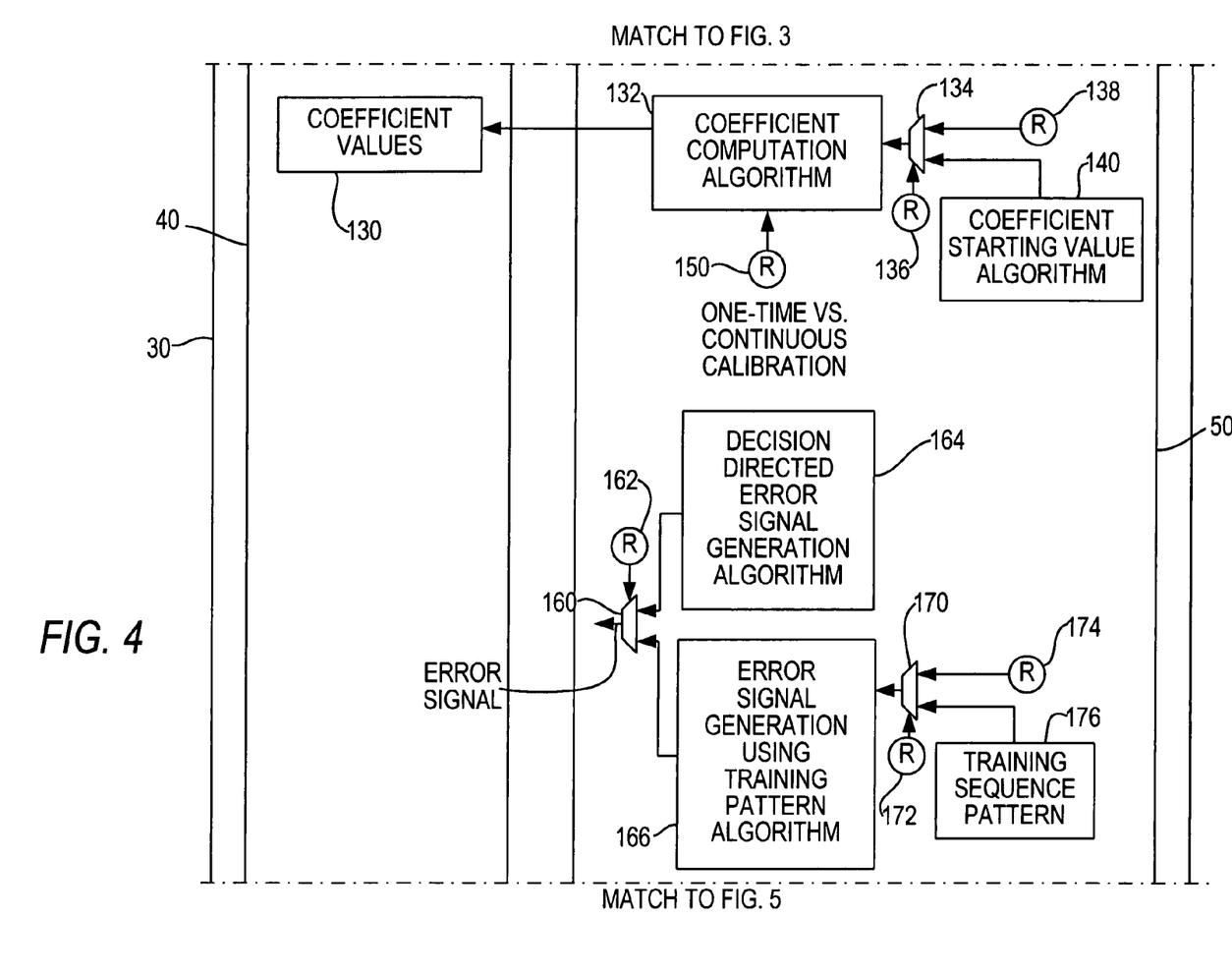
Figure 5:
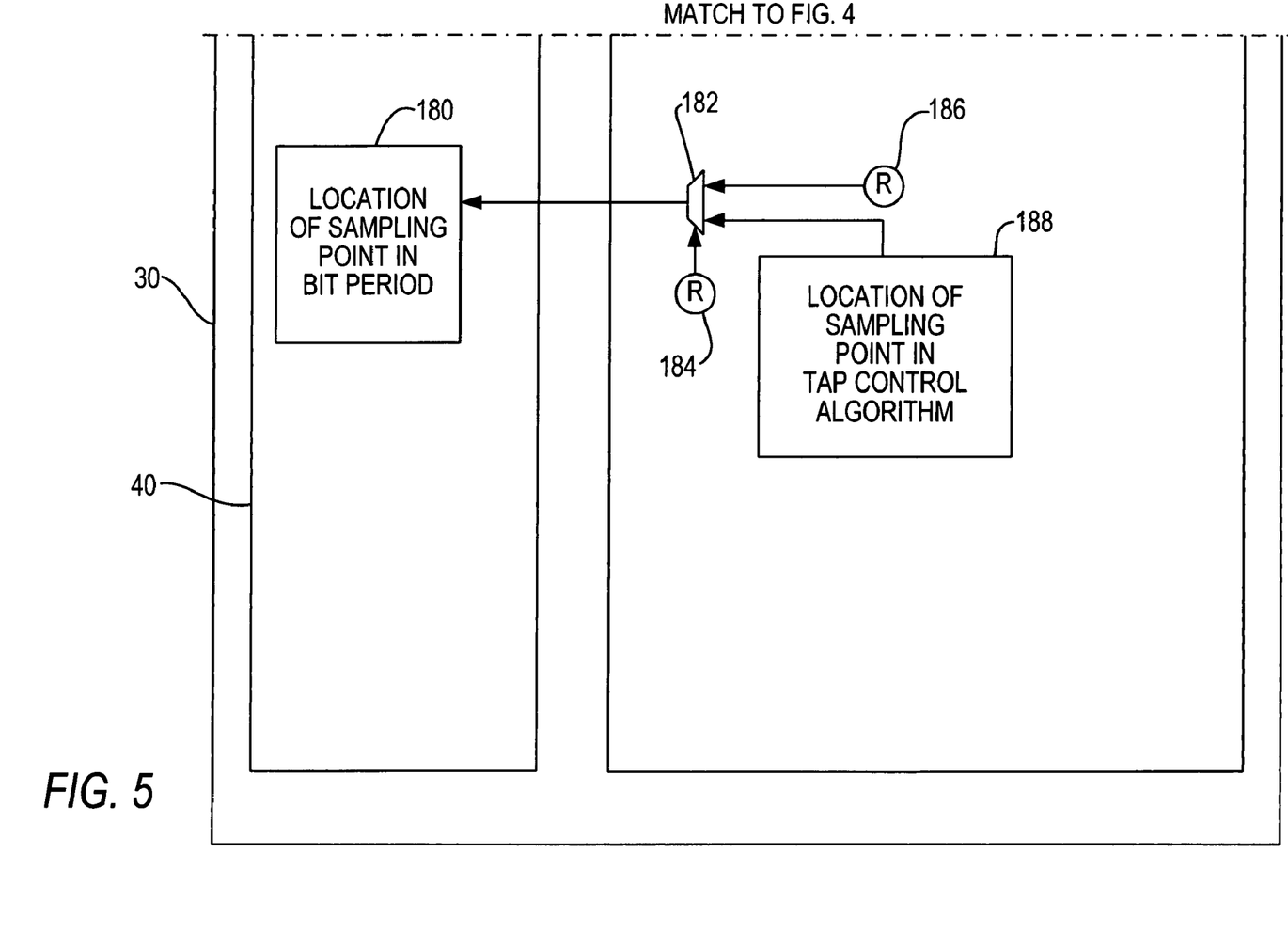

FIGS. 3-5 show an illustrative embodiment of PLD 30 in more detail. As shown in FIG. 3 (and continued into FIGS. 4 and 5), PLD 30 includes equalization implementation circuitry 40, equalization control circuitry 50, and utilization and/or other circuitry 60. Equalization implementation circuitry 40 operates on incoming signal 22 to equalize it and thereby produce equalized signal 42. Circuitry 40 may be implemented using dedicated, special-purpose circuit elements (so-called "hard IP" (intellectual property)), or it may be implemented using more general-purpose circuit elements (e.g., programmable logic circuitry) that has been specially programmed (so-called "soft IP) to perform equalization tasks, or circuitry 40 may be implemented by a combination of hard and soft IP. Circuitry 40 includes a number of parts (e.g., 110, 120, etc.) that will be discussed in more detail later in this specification.

Equalization control circuitry 50 provides signals for controlling the various parts of circuitry 40. As part of providing such control signals, circuitry 50 may make signal selections and/or perform algorithms to determine what those control signals should be. One of the functions of circuitry 50 may be to compare the equalized signal to a reference signal to produce an error signal. Equalized signal 42 is an input to circuitry 50. Circuitry 50 includes a number of parts (e.g., 112, 114, 116, etc.) that will be discussed in more detail later in this specification. These various parts of circuitry 50 may be implemented using hard IP, soft IP, or combinations thereof.

Utilization and/or other circuitry 60 may make any desired use of equalized signal 42 and/or it may pass on the equalized signal to other components (not shown) that are associated with (and thus in this respect served by) PLD 30.

The circuitry shown in FIGS. 3-5 can perform equalization of incoming signal 22 in any of one or more of several respects. These various respects will now be discussed in turn.

The first aspect of available equalization control is control of the number of taps that are included in the circuit performing the equalization. This aspect of the circuitry is implemented by element 110 in circuitry 40 and by elements 112, 114, 116, and 118 in circuitry 50. Element 110 implements how many taps are included in the circuit performing the equalization. One or more signals indicative of how many taps should be included are supplied to element 110 from the output(s) of multiplexer circuitry 114. (In general, throughout this specification (including the appended claims) references to a signal will be understood to include multiple signals and vice versa. The same is true for words like input and output. For example, a reference to outputs will be understood to also include the possibility that there may be only one output and vice versa. With that general understanding in mind, terminology used herein can be simplified by arbitrarily and interchangeably using either the singular or the plural of these kinds of terms. Occasionally a reminder that both singular and plural possibilities are covered by use of either the singular or plural term may be provided. But omission of such an express statement does not negate the general rule that both singular and plural possibilities are covered by either form of reference.) Element 110 responds to the outputs of multiplexer circuitry 112 by putting into service in the equalization circuitry the number of taps indicated by those outputs.

Multiplexer circuitry 112 is controlled by programmable element 114 to get its outputs from either of its sets of inputs. Programmable element 114 may be a RAM bit that is programmed when PLD 30 is configured (e.g., by the user). The same is true for the other programmable elements that are described later in this specification. (These programmable elements are another example of components that can be provided in any number, so that any reference herein to either single or plural programmable elements will be understood to include both single and plural configurations as possibilities.) The first selectable set of inputs to multiplexer circuitry 112 are the outputs of programmable elements 116. The second selectable set of inputs to multiplexer circuitry 112 are the outputs of element 118. Programmable elements 116 allow the user to dictate the number of taps that will be used. To do this, the user programs elements 116 to indicate the desired number of taps, and the user programs element 114 to cause multiplexer circuitry 112 to select the outputs of elements 116 for application to element 110. Alternatively, the user can program circuitry 112 to select the outputs of element 118 for application to element 110. Element 118 is circuitry for performing what is called a "number of taps control algorithm." This algorithm can be any algorithm for automatically determining how many taps should be used based on whatever criteria it is desired to consider. For example, this algorithm may start with a low number of taps. If satisfactory equalization cannot be achieved, the algorithm may gradually increase the number of taps until satisfactory equalization is achieved.

Examples of why it is desirable in a PLD to provide the foregoing flexibility regarding the number of taps used and the ways in which that number can be determined are as follows. The range of possible users of and applications for a PLD are wide. Thus it is desirable to provide programmability in the number of taps used for equalization. A very attenuated medium 22 may require more taps to equalize properly. On the other hand, short backplanes or cables can reduce adaptation time (time required to determine what equalization is required) and power consumption by reducing the number of taps.

Element 118 may itself have some elements of programmability. For example, a user may be able to programmably specify the number of taps that the algorithm of element 118 will start with and/or the maximum number of taps that the algorithm may attempt to use. As another example, element 118 may be capable of performing two or more different algorithms for determining the number of taps to be used, and the user may programmably select which algorithm will be used.

The second aspect of available equalization control is selection of use of integer spaced taps or fractional spaced taps in the circuit performing the equalization. Integer spaced taps effectively operate on the incoming signal at the symbol rate (i.e., once per symbol period) or an integer multiple of the symbol period of the incoming signal. Fractional spaced taps effectively operate on the incoming signal at some multiple of (e.g., 2, 3, 4, etc., times) the symbol rate. (The symbol rate and the symbol period are reciprocally related to one another. The last sentence before this parenthetical is therefore the same as saying that the fractional spacing of the taps is ½, ⅓, ¼, etc. of the symbol period or bit period of the incoming data signal 22.) Elements 120, 122, 124, 126, and 128 implement this aspect of equalization control.

Element 120 (in circuitry 40) implements whether integer or fractional taps are used by the circuitry performing the equalization. In addition, element 120 typically implements what integer is used in the case of integer taps and what fraction is used in the case of fractional taps. Element 120 is controlled by the outputs of multiplexer circuitry 122 (in circuitry 50).

Multiplexer circuitry 122 is controlled by programmable element 124 to select either of its selectable input sets for application to element 120. One of these selectable input sets comes from programmable elements 126. The other selectable input set comes from element 128. Elements 126 allow the user to specify whether integer or fractional spaced taps will be used, and possibly also what integer or what fraction will be used. Alternatively, element 128 performs an algorithm for automatically or at least partly automatically making these determinations based on any criteria that it is desired to consider.

There may be some programmable aspects to the operation of element 128. For example, element 128 may be capable of implementing two or more different algorithms, and the user may be able to make a programmable selection of which algorithm may be used. As another example, the user may be able to programmably select an integer limit or limits, or a fraction limit or limits that element 128 must observe.

Because a PLD may be expected to be able to support a wide range of data rates, it can be an advantage to provide the ability to support either fractional or integer spaced taps as described above.

A third aspect of available equalization control has to do with how the starting values for equalization function coefficients are determined. This aspect is implemented by elements 130, 132, 134, 136, 138, and 140 (FIG. 4).

Element 130 (in circuitry 40) stores the coefficient values that are used in the circuitry performing the equalization. These coefficient values are determined by coefficient computation algorithm 132 (in circuitry 50). Starting values for these coefficients are supplied via the outputs of multiplexer circuitry 134. This circuitry is controlled by programmable element 136 to get its outputs from either programmable elements 138 or from coefficient starting value algorithm 140.

In this way the user can either specify the coefficient starting values (using programmable elements 138) or allow the circuitry to automatically or at least partly automatically determine the coefficient starting values (using element 140).

As in the case of other equalization aspects discussed above, there may be programmable aspects to element 140. For example, the user may be able to specify limits within which element 140 is to operate.

It is desirable to provide the coefficient starting value options described above. A good guess programmed in by the user can greatly reduce adaptation time. On the other hand, if the user cannot provide a good guess, then it may be preferable to use element 140, because a bad starting point may lead to longer adaptation time or perhaps never converging on a solution.

Typically a coefficient value cannot exceed plus or minus 1 (+/−1) because coefficients are normalized with respect to the main bit. It is therefore necessary to provide enough RAM bits 138 and algorithm 140 output bus width to adequately represent a fraction between +/−1 for each coefficient.

A fourth aspect of available equalization control relates to the choice of how to generate an error signal for use whenever such a signal is needed in the equalization adaptation process. The options provided are decision directed error signal algorithm 164 and an algorithm 166 for error signal generation using a training pattern. The user can select either of these options by programming programmable element 162 to control multiplexer circuitry 160 to derive the error signal from the desired source (164 or 166).

This aspect of the circuitry allows the user to select whether a training pattern is available. Using a training pattern can greatly speed up convergence and improve the accuracy of the algorithm. On the other hand, some users may not be able to tolerate sending a training pattern. So having a decision directed alternative available allows PLD 30 to support a wider range of users.

A fifth aspect of available equalization control relates to allowing a user who is able to supply a training pattern for use during adaptation of the equalization to specify and change the training pattern. This aspect is implemented by elements 170, 172, 174, and 176. A predetermined training pattern is stored in element 176. A user who wants to can store a different training pattern in programmable elements 174. The user programs programmable element 172 to control multiplexer circuitry 170 to supply to element 166 either the training pattern from element 176 or the training pattern from elements 174.

A sixth aspect of available equalization control relates to whether PLD 30 performs one equalization adaptation cycle or continues to adapt the equalization to possible changes in the environment. This aspect is implemented by programmable element 150, which the user can program to tell element 132 whether to stop and lock in the coefficient values that have been determined when the adaptation algorithm is first completed, or to continue to operate to adjust the coefficient values in the event that the equalization needed changes in any respect. Continuous or on-going calibration may consume more power, but it allows the adaptive equalizer to continuously monitor line 42 (FIG. 3) for any changes that may require new coefficients. Element 132 would then supply those new coefficients to element 130.

A seventh aspect of available equalization control relates to determining the location of the sampling point in the bit period of incoming signal 22. This aspect is implemented by elements 180, 182, 184, 186, and 188 (FIG. 5).

Element 180 (in circuitry 40) controls where in the incoming signal bit period that signal is sampled for use in the equalization circuitry tap(s). Because PLD 30 is preferably designed to support a wide range of data rates, extending into very high frequencies, a particular sampling point location may not be optimal in all cases. The aspect of the circuitry now being described allows the sampling to be moved to fine tune its placement. Elements 182, 184, 186, and 188 allow the user to use either a sampling location determined at least partly automatically by an algorithm 188 implemented by the circuitry, or to specify a sampling location by appropriately programming programmable elements 188. The user programs programmable element 184 to cause multiplexer circuitry 182 to pass the outputs of element 188 on to element 180 if the user wants element 188 to select the sampling location. Alternatively, the user programs element 184 to cause multiplexer circuitry 182 to pass the outputs of elements 186 on to element 180 if the user wants element 180 to use a sampling location the user has specified.

It should be understood that all embodiments of the invention do not necessarily include all of the above-described aspects of equalization control. It is also within the scope of the invention to use any one or more of the above-described aspects.

Figure 6:
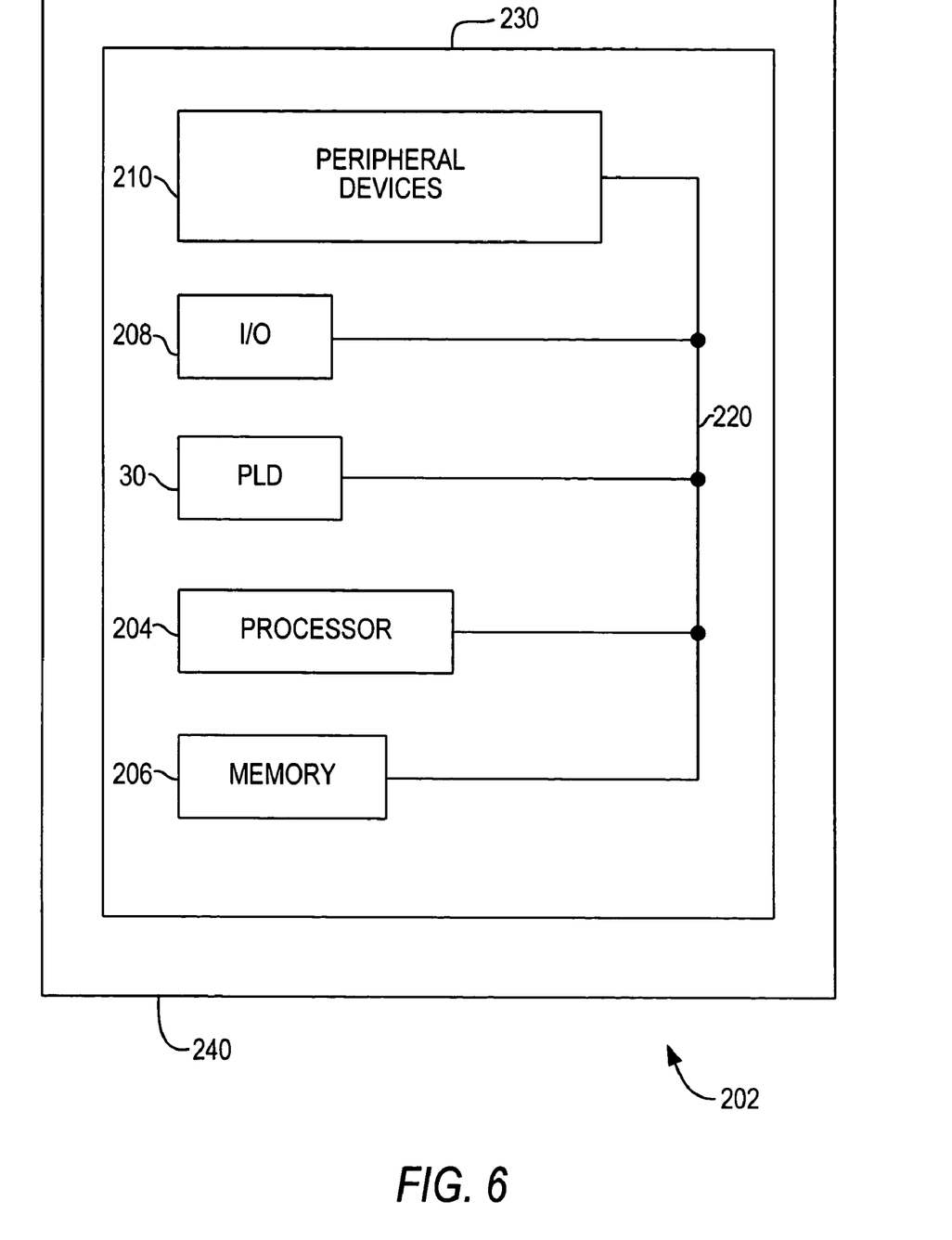
FIG. 6 is a simplified block diagram of an illustrative larger system employing circuitry in accordance with the invention.

FIG. 6 illustrates a PLD 30 of this invention in a data processing system 202. Data processing system 202 may also include one or more of the following components: a processor 204; memory 206; I/O circuitry 208; and peripheral devices 210. These components (including PLD 30) are coupled together by a system bus or other interconnections 220 and are populated on a circuit board 230 (e.g., a printed circuit board) that is contained in an end-user system 240. Any of the connections to element 30 from any other element(s) may make use of the adaptive equalization capability of PLD 30. Similarly, additional instances of programmable logic circuitry with adaptive equalization capability in accordance with the invention may be included in any of the other system components so that those components can also have the benefits of the invention in processing signals they receive.

System 202 can be used in a wide variety of applications, such as computer networking, data networking, instrumentation, video processing, digital signal processing, or any other application where the advantage of using programmable or reprogrammable logic is desirable. PLD 30 can be used to perform a variety of different logic or other functions. For example, PLD 30 can be configured as a processor or controller that works in cooperation with processor 204. PLD 30 may also be used as an arbiter for arbitrating access to a shared resource in system 202. In yet another example, PLD 30 can be configured as an interface between processor 204 and one of the other components in system 202. It should be noted that system 202 is only exemplary, and that the true scope and spirit of the invention should be indicated by the following claims.

Various technologies can be used to implement PLDs 30 having the features of this invention, as well as the various components of those devices (e.g., the programmable function control elements ("FCEs") such as elements 114 and 116 in FIG. 3 and the like). For example, FCEs can be SRAMs, DRAMs, first-in first-out ("FIFO") memories, EPROMs, EEPROMs, function control registers (e.g., as in Wahlstrom U.S. Pat. No. 3,473,160), ferro-electric memories, fuses, anti-fuses, or the like. From the various examples mentioned above it will be seen that this invention is applicable to both one-time-only programmable and reprogrammable devices.

It will be understood that the foregoing is only illustrative of the principles of the invention, and that various modifications can be made by those skilled in the art without departing from the scope and spirit of the invention. For example, the underlying adaptive equalization circuitry and techniques used (exclusive of features added by the present invention) can be any suitable known circuitry and techniques. As illustrations of this point, the algorithms referred to in elements 118, 128, 132, 140, 164, 166, and 188 can be any suitable known algorithms. In the appended claims it is sometimes said that various parameters are "computed" or determined by "computing." This type of language generally parallels use of the term "algorithm" in the accompanying FIGS. and the above discussion. It will be understood, however, such computing may take any of many forms, including the use of look-up tables or the like. Another way to state this point is that look-up tables or the like are among the techniques that are referred to herein as algorithms.

The invention claimed is:

1. Receiver circuitry for adaptively equalizing a data signal, the receiver circuitry comprising:
 equalization implementation circuitry that includes a selectable number of taps, wherein the equalization implementation circuitry operates on the data signal;
 programmable circuitry that is programmed by configuration data with a first value corresponding to a first number of taps;
 processing circuitry that computes a second value corresponding to a second number of taps; and
 selection circuitry that selects, based on a control signal, one of the first and second values as the selectable number of taps at the time the programmable circuitry is being programmed by the configuration data, wherein the selection circuitry selects one of the first and second values only once while the equalization implementation circuitry operates on the data signal; and
 wherein the selectable number of taps of the equalization implementation circuitry corresponds to the selected one of the first and second values.

2. The circuitry defined in claim 1 wherein the processing circuitry performs an algorithm to compute the second number.

3. A digital processing system comprising:
 processor circuitry;
 a memory coupled to the processor circuitry; and
 the receiver circuitry as defined in claim 1 coupled to the processor circuitry and the memory.

4. A printed circuit board on which is mounted receiver circuitry as defined in claim 1.

5. The printed circuit board defined in claim 4 further comprising:
 a memory mounted on the printed circuit board and coupled to the receiver circuitry.

6. The printed circuit board defined in claim 4 further comprising:
 processor circuitry mounted on the printed circuit board and coupled to the receiver circuitry.

7. The circuitry defined in claim 1 wherein the programmable circuitry comprises first and second programmable elements, wherein the first programmable element allows the first value to be specified and the second programmable element controls the selection made by the selection circuitry.

8. The circuitry defined in claim 1 wherein:
 the programmable circuitry outputs the first value and a control signal;
 the processing circuitry outputs the second value in parallel with the first value;
 the selection circuitry:
  receives the control signal from the programmable circuitry, the first value and the second value in parallel;
  selects, based on the received control signal, one of the first and second values; and
  outputs the selected one of the first and second values to the equalization implementation circuitry.

9. Receiver circuitry for adaptively equalizing a data signal, the receiver circuitry comprising:
 equalization implementation circuitry that includes a filter with taps having a selected one of integer tap spacing and fractional tap spacing relative to the symbol rate of the data signal, wherein the equalization implementation circuitry operates on the data signal;
 programmable circuitry that is programmed by configuration data with a first value indicating a first selection between integer spacing and fractional spacing of the taps;
 processing circuitry that computes a second value indicating a second selection between integer spacing and fractional spacing of the taps; and
 selection circuitry that selects one of the first and second values as the selected one of integer spacing and fractional spacing at the time the programmable circuitry is being programmed by the configuration data, wherein the selection circuitry selects one of the first and second values only once while the equalization implementation circuitry operates on the data signal; and
 wherein the selection between the integer and fractional tap spacing corresponds to the selected one of the first and second values.

10. The circuitry defined in claim 9 wherein the processing circuitry performs an algorithm to compute the second selection.

11. The circuitry defined in claim 9 wherein the fractional spacing is a selectable fraction of the symbol period, wherein the first selection can include a programmably specified first fraction, and wherein the second selection can include a processing-circuitry-computed second fraction.

12. The circuitry defined in claim 9 wherein the programmable circuitry comprises first and second programmable elements, wherein the first programmable element allows the first value to be specified and the second programmable element controls the selection made by the selection circuitry.

13. The circuitry defined in claim 9 wherein:
 the programmable circuitry outputs the first value and a control signal;
 the processing circuitry outputs the second value in parallel with the first value; and
 the selection circuitry:
  receives the control signal from the programmable circuitry, the first value and the second value in parallel;
  selects, based on the control signal, one of the first and second values; and
  outputs the selected one of the first and second values to the equalization implementation circuitry.

14. Receiver circuitry for adaptively equalizing a data signal, the receiver circuitry comprising:
 equalization implementation circuitry that includes at least one selectable coefficient value;
 first processing circuitry for computing the coefficient value using a selectable starting value, wherein the coefficient value is different from the starting value;
 programmable circuitry that is programmed by configuration data with a first starting value and outputs the first starting value and a control signal;
 second processing circuitry that computes a second starting value and outputs the second starting value in parallel with the first value; and
 selection circuitry that:

receives the control signal from the programmable circuitry, the first starting value and the second starting value in parallel;

selects, based on the control signal, one of the first and second starting values at the time the programmable circuitry is being programmed by the configuration data, wherein the selection circuitry selects one of the first and second starting values only once; and outputs the selected one of the first and second starting values to the first processing circuitry, wherein the selectable starting value of the first processing circuitry corresponds to the selected one of the first and second values.

15. The circuitry defined in claim 14 wherein the first processing circuitry performs an algorithm to compute the coefficient value.

16. The circuitry defined in claim 14 wherein the second processing circuitry performs an algorithm to compute the second starting value.

17. The circuitry defined in claim 14 further comprising:
further programmable circuitry for allowing selection between (1) operation of the first processing circuitry to fix on the coefficient value that produces satisfactory equalization, and (2) continued operation of the first processing circuitry to continue to possibly adapt the coefficient value even after satisfactory equalization has been produced.

18. The circuitry defined in claim 14 wherein the programmable circuitry comprises first and second programmable elements, wherein the first programmable element allows the first starting value to be specified and the second programmable element provides the first control signal.

19. Receiver circuitry for adaptively equalizing a received data signal, the receiver circuitry comprising:
first processing circuitry for computing a first error signal using a selectable training pattern, wherein the first processing circuitry operates on the data signal;
programmable circuitry that is programmed by configuration data with a first training pattern and outputs the first training pattern and a first control signal;
training pattern circuitry that stores a second training pattern and outputs the second training pattern in parallel with the first training pattern; and
first selection circuitry that:
receives the first control signal from the programmable circuitry, the first training pattern and the second training pattern in parallel;
selects, based on the first control signal, one of the first and second training patterns at the time the programmable circuitry is being programmed by the configuration data, wherein the first selection circuitry selects one of the first and second training patterns only once while the processing circuitry operates on the data signal; and
outputs the selected one of the first and second training patterns to the first processing circuitry.

20. The circuitry defined in claim 19 wherein the first processing circuitry performs an algorithm to compute the first error signal using a training pattern.

21. The circuitry defined in claim 19 wherein the programmable circuitry comprises first and second programmable elements, wherein the first programmable element allows the first training pattern to be specified and the second programmable element provides the first control signal.

22. The circuitry defined in claim 19 further comprising:
equalization implementation circuitry responsive to an error signal, wherein the equalization implementation circuitry operates on the data signal;
wherein the first processing circuitry receives the selected one of the first and second training patterns and computes the first error signal using the selected training pattern and outputs the first error signal;
second processing circuitry that computes a second decision directed error signal using a training pattern and outputs the second error signal in parallel with the first error signal; and
second selection circuitry that:
receives a second control signal from the programmable circuitry, the first error signal and the second error signal in parallel;
selects, based on the second control signal, one of the first and second error signals; and
outputs the selected one of the first and second error signals to the equalization implementation circuitry,
wherein the equalization implementation circuitry is responsive to the selected one of the first and second error signals.

23. The circuitry defined in claim 22 wherein the second processing circuitry performs an algorithm to compute the second decision directed error signal.

24. Receiver circuitry for adaptively equalizing a data signal, the receiver circuitry comprising:
equalization implementation circuitry, in the receiver circuitry, having at least one sampling point with a selectable location relative to a bit period of the received signal, wherein the equalization implementation circuitry operates on the data signal;
programmable circuitry that is programmed by configuration data with a first value corresponding to a first location of the sampling point and outputs the first value and a control signal;
processing circuitry that computes a second value corresponding to a second location of the sampling point and outputs the second value in parallel with the first value; and
selection circuitry that:
receives the control signal from the programmable circuitry, the first value and the second value in parallel;
selects, based on the control signal, one of the first and second values at the time the programmable circuitry is being programmed by the configuration data, wherein the selection circuitry selects one of the first and second values only once, while the equalization implementation circuitry operates on the data signal; and
outputs the selected one of the first and second values to the equalization implementation circuitry,
wherein the location of the at least one sampling point of the equalization implementation circuitry corresponds to the selected one of the first and second values.

25. The circuitry defined in claim 24 wherein the programmable circuitry comprises first and second programmable elements, wherein the first programmable element allows the value to be specified and the second programmable element provides the control signal.

26. A method of operating receiver circuitry having programmable circuitry and adaptive equalization capability, the method comprising:
programming the programmable circuitry using configuration data with a first value corresponding to a first number of taps;

computing a second value corresponding to a second number of taps;

selecting, at the time the programmable circuitry is being programmed by the configuration data, one of the first and second values, wherein the selecting selects one of the first and second values only once while equalization implementation circuitry operates on a data signal;

providing the selected one of the first and second values to the equalization implementation circuitry; and controlling the equalization implementation circuitry to operate with a number of taps corresponding to the selected one of the first and second values.

27. The method of claim 26 wherein:

the programmable circuitry outputs the first value and a control signal; and the control signal, the first value and the second value are received in parallel.

28. A method of operating receiver circuitry having programmable circuitry and equalization implementation circuitry that includes a filter with taps, the method comprising:

programming the programmable circuitry using configuration data with a first value indicating a first selection between integer spacing and fractional spacing of the taps;

computing a second value indicating a second selection between integer spacing and fractional spacing of the taps;

selecting, at the time the programmable circuitry is being programmed by the configuration data, based on the received control signal, one of the received first and second values, wherein the selecting selects one of the received first and second values only once while the equalization implementation circuitry operates on a data signal;

providing the selected one of the first and second values to the equalization implementation circuitry; and controlling the filter of the equalization implementation circuitry, in the receiver circuitry, to operate with the tap spacing corresponding to the selected one of the first and second values.

29. The method of claim 28 wherein:

the programmable circuitry outputs the first value and a control signal; and the control signal, the first value and the second value are received in parallel.

30. A method of operating receiver circuitry having programmable circuitry and adaptive equalization capability, the method comprising:

programming the programmable circuitry using configuration data with a first starting value, wherein the programmable circuitry outputs the first starting value and a control signal;

computing a second starting value;

receiving the control signal, the first starting value and the second starting value in parallel;

selecting, at the time the programmable circuitry is being programmed by the configuration data, based on the received control signal, one of the received first and second starting values, wherein the selecting selects one of the received first and second values only once while equalization implementation circuitry operates on a data signal;

processing the selected one of the first and second starting values to compute a coefficient value different from the selected starting value; and operating the equalization implementation circuitry, in the receiver circuitry, using the computed coefficient.

31. The method of claim 30 further comprising:

selecting, at the time the programmable circuitry is being programmed by the configuration data, whether the computed coefficient to be used in equalization implementation circuitry is to be determined once or on an on-going basis; and determining the computed coefficient in accordance with the selecting.

32. A method of operating receiver circuitry having programmable circuitry and adaptive equalization capability, the method comprising:

programming the programmable circuitry using configuration data with a first training pattern, wherein the programmable circuitry outputs the first training pattern and a first control signal;

computing a second training pattern to output the second training pattern;

receiving the first control signal, the first starting training pattern and the second training pattern in parallel; and selecting, based on the first control signal, one of the received first and second training patterns at the time the programmable circuitry is being programmed by the configuration data, wherein the selecting selects one of the first and second the training patterns only once, based on the configuration data, while equalization implementation circuitry operates on a data signal.

33. The method of claim 32 further comprising:

computing a first error signal based on the selected training pattern;

computing a second decision directed error signal based on a training pattern;

receiving the second control signal, the first error signal and the second error signal in parallel;

selecting, based on a second control signal provided by the programmable circuitry, one of the received first and second error signals; and using the selected one of the first and second error signals in a determination of at least one operating parameter of the equalization implementation circuitry.

34. A method of operating receiver circuitry having programmable circuitry and adaptive equalization capability, the method comprising:

programming the programmable circuitry using configuration data with a first value corresponding to a first sampling location, wherein the programmable circuitry outputs the first value and a control signal;

computing a second value corresponding to a second sampling location;

receiving the control signal, the first value and the second value in parallel;

selecting, at the time the programmable circuitry is being programmed by the configuration data, based on the received control signal, one of the received first and second values, wherein the selecting selects one of the received first and second values only once while equalization implementation circuitry operates on the data signal;

providing the selected one of the first and second values to the equalization implementation circuitry; and operating the equalization implementation circuitry, in the receiver circuitry, using the sampling location corresponding to the selected one of the first and second values.

* * * * *